(12) United States Patent
Frenken et al.

(10) Patent No.: US 12,420,399 B2
(45) Date of Patent: Sep. 23, 2025

(54) HAND TOOL DESIGNED TO BE REMOTELY CONTROLLED, AND TOOL DESIGNED TO BE REMOTELY CONTROLLED

(71) Applicant: GUSTAV KLAUKE GMBH, Remscheid (DE)

(72) Inventors: Egbert Frenken, Heinsberg (DE); Andreas Lehr, Neuss (DE)

(73) Assignee: GUSTAV KLAUKE GMBH, Remscheid (DE)

( * ) Notice: Subject to any disclaimer, the term of this patent is extended or adjusted under 35 U.S.C. 154(b) by 771 days.

(21) Appl. No.: 17/251,431

(22) PCT Filed: Jun. 11, 2019

(86) PCT No.: PCT/EP2019/065183
§ 371 (c)(1),
(2) Date: Dec. 11, 2020

(87) PCT Pub. No.: WO2019/238660
PCT Pub. Date: Dec. 19, 2019

(65) Prior Publication Data
US 2021/0299845 A1    Sep. 30, 2021

(30) Foreign Application Priority Data

Jun. 12, 2018 (DE) ............. 10 2018 114 014.2

(51) Int. Cl.
*B25F 5/02* (2006.01)
*B64U 10/13* (2023.01)
(Continued)

(52) U.S. Cl.
CPC ............... *B25F 5/02* (2013.01); *B64U 10/13* (2023.01); *B64U 10/14* (2023.01); *H02G 1/005* (2013.01);
(Continued)

(58) Field of Classification Search
CPC ....... B25F 5/02; B64U 10/14; B64U 2101/25; B64U 2201/20; B64U 10/13;
(Continued)

(56) References Cited

U.S. PATENT DOCUMENTS 3,949,817 A * 4/1976 Rice ............... B27B 17/0008
                                                        16/427
6,284,970 B1   9/2001 Buskmiller et al.
(Continued)

FOREIGN PATENT DOCUMENTS

CN    103878418 A    6/2014
CN    105857593 A    8/2016
(Continued)

OTHER PUBLICATIONS

Noodle Tail ("Killerdrone! & Effective Anti-Drone Countermeasures" uploaded on Apr. 1, 2016—https://www.youtube.com/watch?v=6Viwwetf0gU) (Year: 2016).*
(Continued)

*Primary Examiner* — Anna K Kinsaul
*Assistant Examiner* — Himchan Song
(74) *Attorney, Agent, or Firm* — Klintworth & Rozenblat LLP

(57) ABSTRACT

A remotely controlled hand tool includes a grip region and an actuating button. A remotely controlled tool includes a holding region and a triggering means. The hand tool or tool enables favorable remote control by a removable application part held in the grip region or holding region. The hand tool or tool is attached to an automatically movable flying vehicle by means of an attachment.

19 Claims, 14 Drawing Sheets

(51) Int. Cl.
  *B64U 10/14* (2023.01)
  *H02G 1/00* (2006.01)
  *H02G 1/02* (2006.01)
  *H02G 1/06* (2006.01)
  *B64U 30/20* (2023.01)
  *B64U 101/25* (2023.01)
  *B64U 101/30* (2023.01)
  *B64U 101/60* (2023.01)

(52) U.S. Cl.
  CPC ............... *H02G 1/02* (2013.01); *H02G 1/06* (2013.01); *B64U 30/20* (2023.01); *B64U 2101/25* (2023.01); *B64U 2101/30* (2023.01); *B64U 2101/60* (2023.01); *B64U 2201/20* (2023.01)

(58) Field of Classification Search
  CPC ............ B64U 2101/00; B64U 2201/10; H02G 1/005; H02G 1/02; H02G 1/06; B64C 39/024
  See application file for complete search history.

(56) References Cited

U.S. PATENT DOCUMENTS

| | | | |
|---|---|---|---|
| 7,254,982 | B2 | 8/2007 | Frenken |
| 8,827,216 | B2 * | 9/2014 | Brown ............... F16M 13/04 248/229.23 |
| 9,420,748 | B2 * | 8/2016 | Chan ................. A01G 3/08 |
| 9,676,481 | B1 | 6/2017 | Buchmueller |
| 10,491,021 | B1 * | 11/2019 | Syracuse ............. B64C 39/04 |
| 10,822,080 | B2 * | 11/2020 | Kirkbride ............. B60L 5/04 |
| 10,836,484 | B2 * | 11/2020 | Volpi ................. B64D 47/00 |
| 10,988,257 | B2 * | 4/2021 | von Flotow ........... B64C 27/14 |
| 11,358,717 | B2 * | 6/2022 | Wabnegger ............ H02G 1/02 |
| 11,526,179 | B2 * | 12/2022 | Maor ................. G05D 1/106 |
| 2015/0314434 | A1 * | 11/2015 | Bevins, Jr. ........... H02G 1/02 408/124 |
| 2016/0340006 | A1 * | 11/2016 | Tang ................. G16H 40/67 |
| 2018/0295272 | A1 * | 10/2018 | Xue .................. H04N 23/695 |
| 2019/0077505 | A1 * | 3/2019 | Akens ................ H02J 50/10 |
| 2020/0019157 | A1 * | 1/2020 | Griffin ............... H04L 67/125 |

FOREIGN PATENT DOCUMENTS

| | | |
|---|---|---|
| CN | 106550054 A | 3/2017 |
| CN | 106941944 A | 7/2017 |
| CN | 107249296 A | 10/2017 |
| EP | 1085798 A2 | 3/2001 |
| EP | 2003057 A2 | 12/2008 |
| EP | 1519813 B1 | 5/2012 |
| WO | 2016/134951 A1 | 9/2016 |
| WO | 2017/125272 A1 | 7/2017 |
| WO | 2018/027242 A1 | 2/2018 |

OTHER PUBLICATIONS

International Search Report for International Patent Application No. PCT/EP2019/065183 dated Sep. 17, 2019, 6 pages.
Written Notification from the International Search Authority for International Patent Application No. PCT/EP2019/065183 dated Sep. 17, 2019, 5 pages.
English machine translation of WO 2016134951 A1.
English machine translation of WO 2017125272 A1.
Noodle Tail, "Killerdrone! Flying chainsaw," retrieved from the Internet: https://www.youtube.com/watch?v=6Viwwetf0gU [retrieved Sep. 9, 2019] XP054979663, the whole document.
Chinese Search Report for Application No. 201980039154.2 dated Mar. 26, 2024.

* cited by examiner

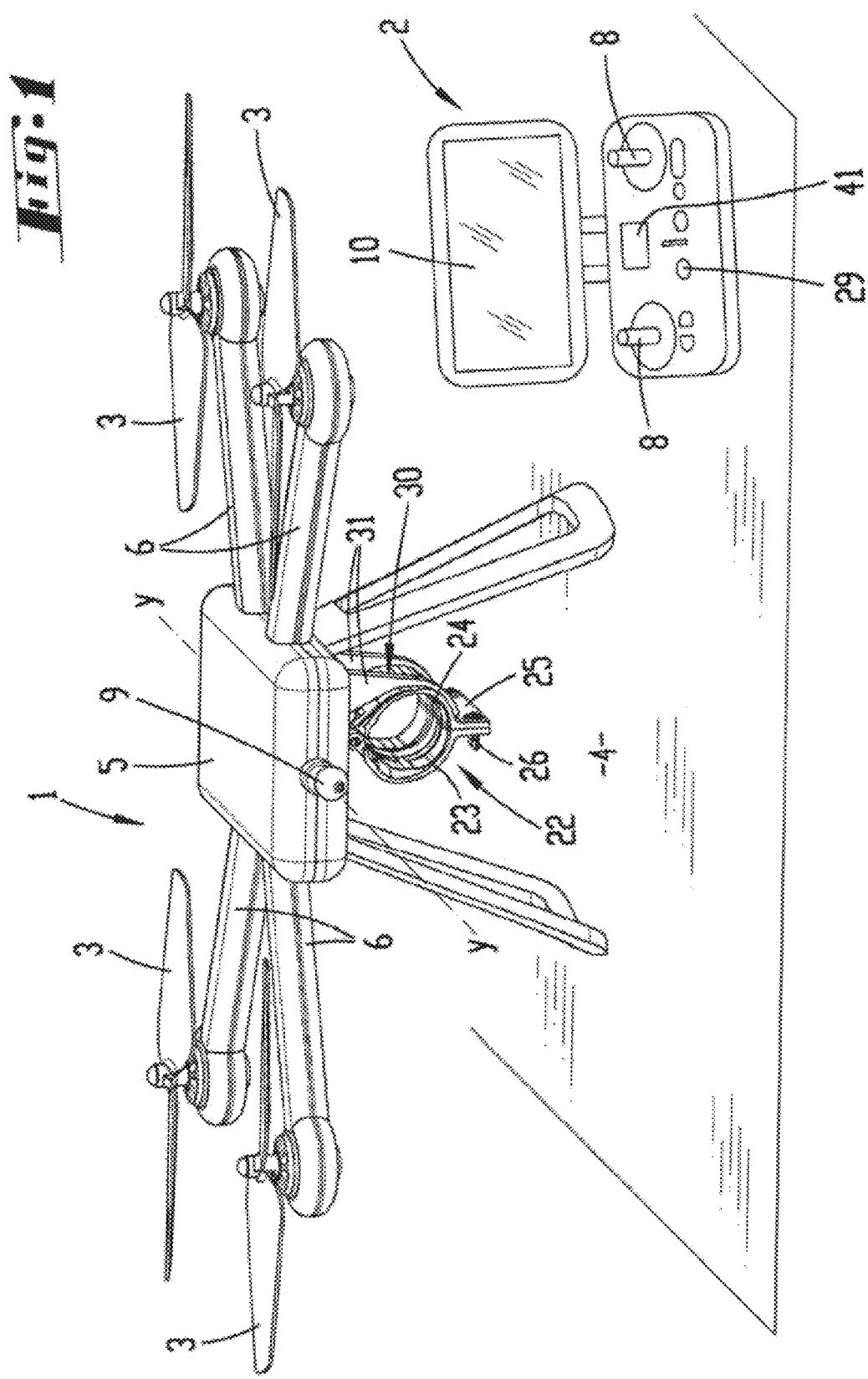

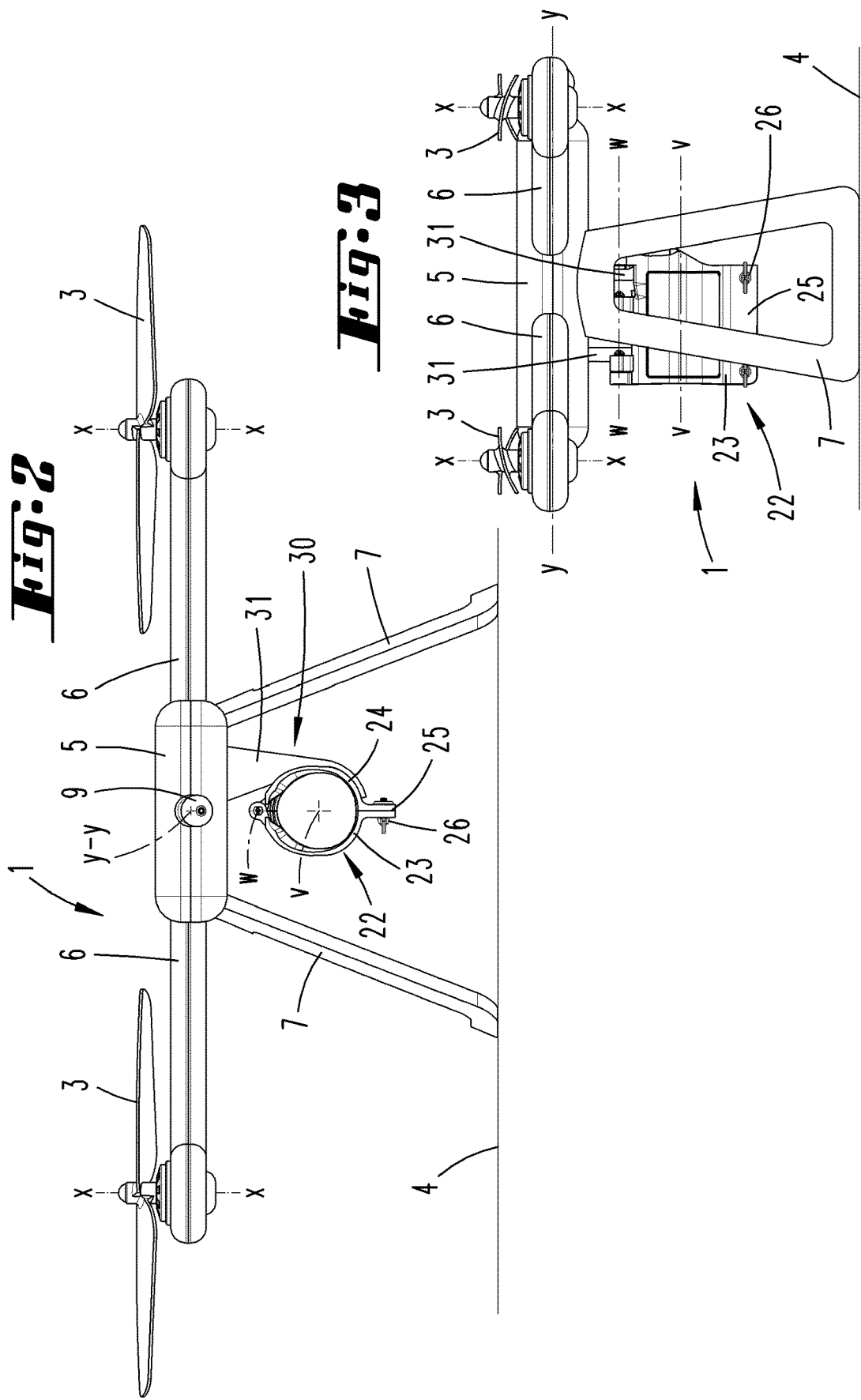

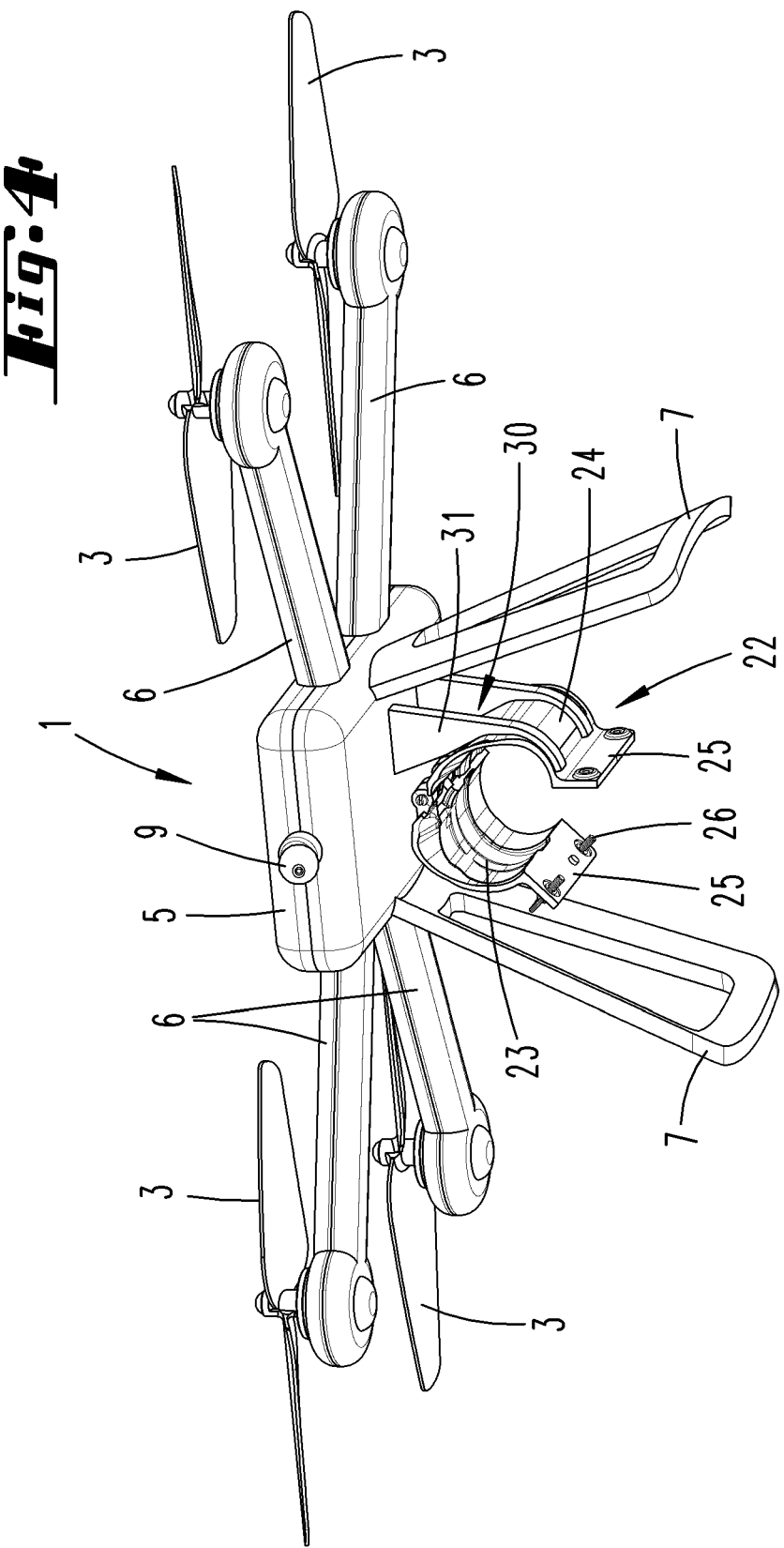

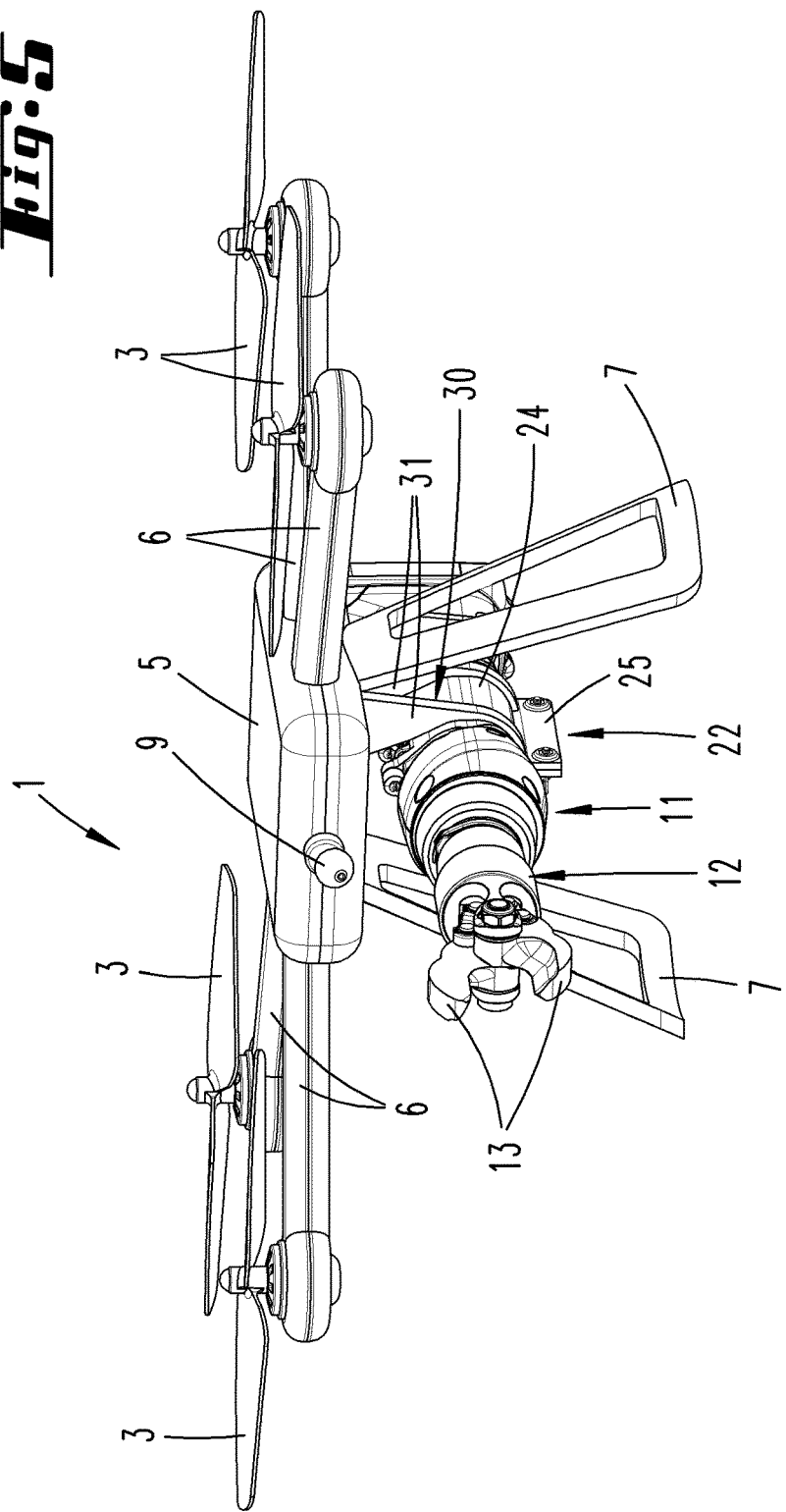

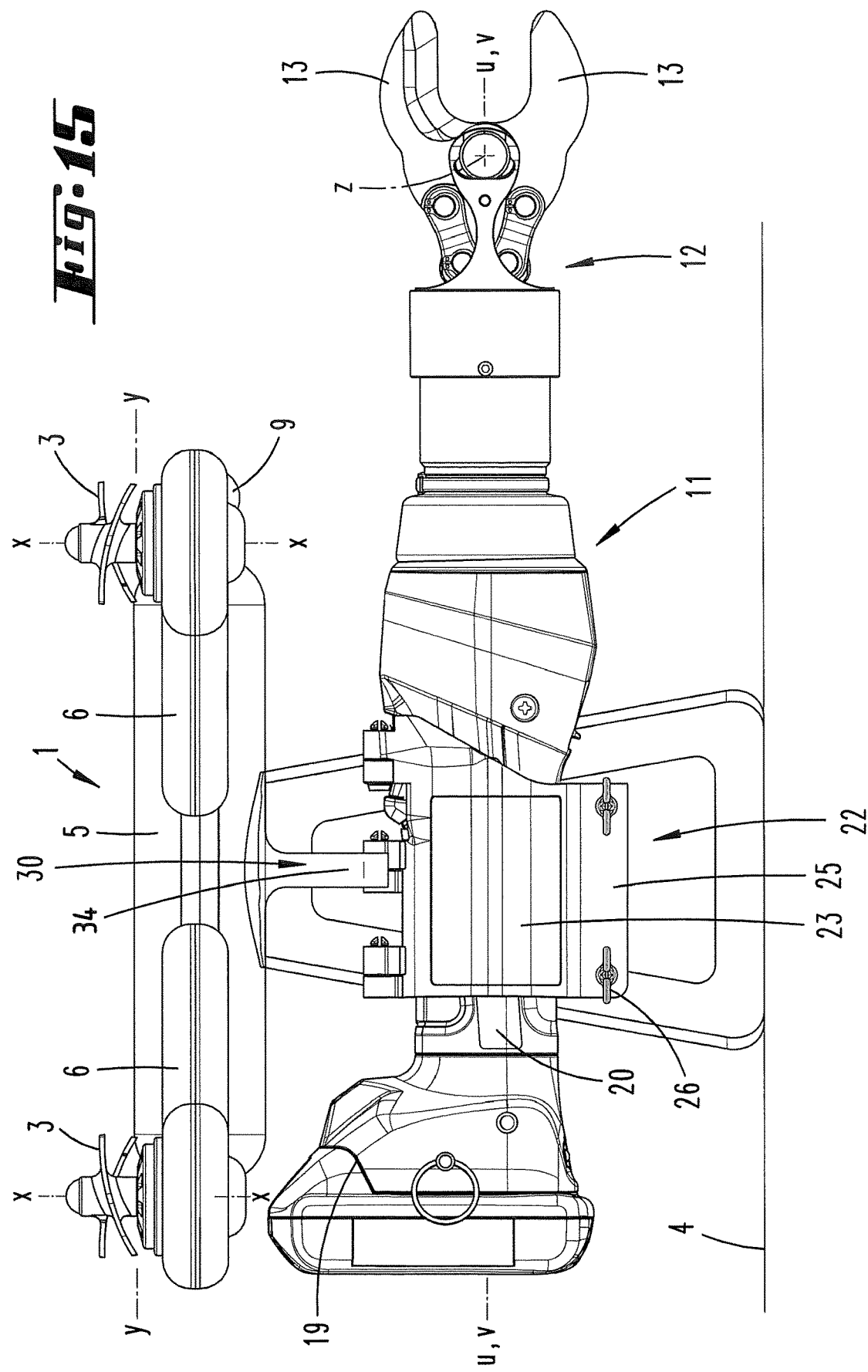

HAND TOOL DESIGNED TO BE REMOTELY CONTROLLED, AND TOOL DESIGNED TO BE REMOTELY CONTROLLED

AREA OF TECHNOLOGY

The invention initially relates to a hand tool designed to be remotely controlled, with a grip region and an actuating button.

The invention further relates to a tool with a holding region and a triggering means.

PRIOR ART

For example, hand tools of the kind in question are known in the form of cutting or pressing tools, further for example according to EP 1085798 B1 (U.S. Pat. No. 6,284,970 B1) or also according to EP 1519813 B1 (U.S. Pat. No. 7,254,982 B2).

If necessary, such hand tools can have a replaceable working head, for example for cutting cables or lines. For example, reference is here made to motor driven scissors known from WO 2017/125272 A1.

Known tools can have a holding region for holding the tool, wherein the holding region can possibly also comprise a grip region. The tool can be triggered by a triggering means, for example in the form of a remote controllable activator or in the form of an actuating button.

The content of these patent applications or patent specifications is hereby included in its entirety in the disclosure of the present invention, also for purposes of including features of these patent applications or patents in claims of the present invention.

There exists a need for remotely controlling the hand tool, in particular during use in difficulty accessible and/or remote areas.

SUMMARY OF THE INVENTION

In view of the prior art described above, the task becomes to further improve a hand tool and/or a tool of the kind in question with respect to enabling a convenient remote control.

A first inventive idea provides a possible solution to the task for both a hand tool and a tool, wherein a removable attachment part held in the grip region or holding region is provided, wherein the hand tool or tool is further attached to an automatically movable flying device by attachment means.

The application part can be a part separate from the hand tool or tool, wherein the hand tool or tool can be provided with the application part to enable a remote control. By way of preferably separate attachment means, the hand tool or tool can be attached directly, but preferably indirectly by way of the application part, to an automatically movable flying device, in particular a remotely controllable flying device.

For example, the flying device, as also preferred, can be an unmanned aerial vehicle (UAV unmanned aerial vehicle). The latter can be equipped with a GPS system, further possibly also with a stabilization system, in particular against influences by wind, rain or generally during bad weather. In addition, the flying device can be provided with an autonomous system for automatic approach and landing.

The flying device is further suitable in particular for use outside of enclosed spaces.

The flying device further preferably has dimensions relative to a possibly provided original model or relative to a comparable flying device that can be provided with a pilot on a scale of about 1:100, up to about 1:10, for example about 1:50. In addition, the flying device can also have sensors, for example which allow autonomous flight.

In the following statements, the invention is most often described in conjunction with a hand tool, in particular one having a grip region and an actuating button. However, the enumerated features and advantages in their entirety also relate to an arrangement involving the use of a tool of the kind described at the outset.

While utilizing the automatically movable flying device, the hand tool attached to the flying device by attachment means can be guided in a favorable way to areas that are difficultly accessible, in particular remote, for example relatively high in comparison to wherein the operator is located, and there supplied to a work area. For example, the work to be performed there using the hand tool can involve cutting through a cable, for example in the area of a highline or transmission mast.

Such a flying device can also be used in enclosed spaces, for example in workshops or the like.

Due to the proposed solution, performing work with a hand tool or tool in higher areas does not require building a scaffold or requesting a lift truck, for example. This also makes it possible to replace cumbersome and sometimes dangerous handling operations, e.g., while standing on a ladder. The work enabled is favorable, quickly performable, and in particular safe for the person performing it.

Additional features of the invention are often explained below, including in the description to the figures, in their preferred allocations to the subject matter of claim 1 or claim 2, or to features of additional claims. However, they can also be important as allocated to only individual features of claim 1 or claim 2 or the respective additional claim, or each independently.

The attachment means can enable a movability of the hand tool or tool relative to the flying device. Given a continued reliable mounting on the flying device, this allows a relative movement, for example and in particular while performing the operation utilizing the hand tool. A relative movement can be achieved by exposing the hand tool to external influences, for example impacts or the like.

As a result of allowing the hand tool to move relative to the flying device, such forces acting on the hand tool are not or at least not to the full extent transmitted to the flying device, which could lead to an impairment of airworthiness.

As preferred, the flying device can be designed for vertical takeoff and landing, for example in the form of a helicopter or a rotorcraft.

The flying device can thus have one or several propellers, for example as a type of quadcopter or the like. In a state where the flying device is standing upright on a subsurface, for example in a state standing upright on a floor, the one or several propellers can here have a rotational axis that runs essentially perpendicular to the subsurface. This propeller rotational axis is preferably also vertically aligned during flight operation, at least oriented along a vertical.

The flying device can also have one or several pedestals, which the flying device can use for support while standing upright on a subsurface. In a preferred embodiment, a vertical distance is here produced between the flying device base body and the subsurface, wherein it is further preferred that this vertical distance between the subsurface and the flying device base body can exceed a largest amount by which the hand tool extends transverse to its longitudinal alignment.

A remote control device can be provided for the flying device. An RC flying device is correspondingly preferred. The user can control the flying device via the remote control device.

The flying device is further adjusted to the hand tool or tool, in particular as relates to the weight and size dimensions of the hand tool. In a state attached to the flying device, the hand tool or tool can have a work area, for example the working head described at the outset, wherein this work area can protrude laterally over the flying device as such in relation to a standing position of the flying device on a subsurface. This makes it possible to lead the flying device provided with the hand tool into a working position without any collisions, wherein the work area of the hand tool can be used in this working position to perform work, for example cutting work.

The or each pedestal of the flying device can protrude downwardly over the hand tool in relation to a state of the flying device parked on the subsurface (standing position). The hand tool or tool extends accordingly in the standing position of the flying device at a distance to the subsurface.

If two pedestals are provided, the hand tool can be attached between these pedestals, as also preferred. For example, the pedestals of the hand tool can here flank the latter on either side in relation to the longitudinal alignment of the hand tool.

The user is to fit the flying device with the hand tool or tool preferably in the standing position. Initially and essentially the attachment part serves this purpose, which in a possible embodiment is connected with the flying device via the attachment means. Also possible is a potential alignment of the hand tool relative to the flying device or relative to the attachment part of the flying device, in particular in the standing position, for example when forming the hand tool-side work area as a cutting tool by correspondingly aligning the pair of blades for cutting horizontally, for example, or in another case vertically running cable or rod sections.

The attachment means can comprise flexible, extendible holding means, with which the hand tool or tool can be released or tightened, following the force of gravity. As a result of this embodiment, the hand tool can be brought into a distanced position, while retaining the attachment to the flying device, making it possible to prevent damage to the flying device, for example due to a whipping effect of the cable, for example when severing free-spanned lines or cables using the hand tool. Even impacts that arise when severing massive rods or the like are correspondingly not transmitted to the flying device, for example; rather, they are preferably fully absorbed by the attachment means.

The distancing between the hand tool and flying device this enables also expands the useful area of application for the hand tool.

In a possible process, the hand tool can be moved to the point of use in the tightened position using the flying device, after which the work area of the hand tool grips the cable to be severed, for example, after which the flying device is moved a distance away from the hand tool while lengthening the holding means. After the work has ended, for example a cutting procedure has been completely performed, the hand tool can be pulled toward the flying device again in a possible embodiment.

For example, a flexible, extendible holding means can be a telescopically extendible or retractable telescoping rod, which is flexible in particular transverse to the traveling direction. In another configuration, the flexible, extendible holding means can comprise a rope, with which the hand tool can be lowered from the flying device or pulled toward the flying device. In this case, for example, the flying device has at least one rope winch, which further can be actuated by an electric motor, for example. Two such rope winches can further be provided, each correspondingly with one rope, wherein the hand tool can be held at the rope ends using the attachment part.

The attachment means can also comprise a flexible attachment arm, which allows the hand tool to move relative to the flying device without otherwise loosening the attachment. In one possible embodiment, for example, such a flexible attachment arm can consist of a flexible plastic material.

According to one possible embodiment, the attachment part can be designed to act on the actuating button of the hand tool. The action can be intentionally triggerable, for example via a corresponding remote control, further provably via the flying device. As further preferred as well, the attachment part can be made to permanently act on the actuating button once it has been fixed in place on the grip region of the hand tool.

In another embodiment, the hand tool can be designed for radio remote control, and to this end have a radio receiver and a control unit, which is designed to convert received radio signals so as to trigger a working movement of the hand tool. Radio remote control can take place using a Bluetooth connection, for example, and possibly a WLAN or WPAN connection as well. In addition, the radio mode essentially used for controlling the flying vehicle can also be used.

Power can be supplied to the radio receivers and control unit, for example, via an accumulator or the like that also supplies the hand tool in one possible embodiment.

The remote control device for the flying device can further have a (separate) actuating element for remotely triggering a working movement of the hand tool. The actuating element can be a switch or button, further for example a sensor, for example a capacitive sensor. In a preferred embodiment, the actuating element lies ergonomically favorably in the area of the remote control device.

In this conjunction, it further proves favorable that the remote control device, apart from a transmitter for controlling the flying device, potentially have a radio transmitter operatively connected via the actuating element, for operative connection with the radio receiver of the hand tool. Actuation of the actuating element by the user triggers a corresponding signal via the radio transmitter, which is received by the radio receiver in the hand tool, and converted by the tool-side control unit into a signal for triggering a working movement of the hand tool.

An energy storage system, for example in the form of an accumulator, can be provided in the remote control device for supplying in particular the radio sensor, but further for also supplying an additionally provided control unit, etc.

The application part can be provided as a cuff designed for enclosing the grip region. The cuff can here be applied in the grip region in such a way as to captively enclose the hand tool.

For favorable assembly and disassembly purposes, the cuff can consist of two cuff parts that are movably hinged with each other. The latter can be swiveled open or closed around an axis, for example which, as also preferred, runs in the same direction as a longitudinal axis of the application part, and preferably also as a further longitudinal axis of the hand tool. This facilitates arrangement on the hand tool, as well as the corresponding removal.

To this end, a cuff part can be roughly half-shell shaped in design essentially in a cross section transverse to the extension of the longitudinal axis.

In the enclosing position, the cuffs can be mechanically locked with each other. A latching mechanism can be used for locking purposes, for example. The lock can likewise be released for removing the application part, preferably non-destructively released. In this regard, a screwed connection can further be provided as well.

In a possible embodiment, a holding recess can be formed on the application part for the fastening means of the flying device. The holding recess can enable the removal of the hand tool together with the application part arranged on the hand tool from the flying device or its attachment means.

As also further preferred, the hand tool can have an electric motor, which can be actuated for performing a working movement. During a conventional handling of the hand tool, electric motor operation can be triggered by actuating an actuating button provided in the grip region. During remote control according to the invention, the electric motor is actuated in one possible embodiment via a generated radio signal converted by the control unit.

The electric motor can drive a spindle in the hand tool. Alternatively, the electric motor can drive a hydraulic pump to act on a hydraulically actuatable working piston. The tool is acted on via the spindles or the working piston.

The hand tool can have one or several working jaws, which can be moved out of a released position into a working position, and out of a working position into a released position. The working jaws can be designed as cutting edges. Only one of the working jaws displaceable out of a released position into a working position and vice versa can further constitute a cutting edge, which interacts with a fixed counter-working jaw.

The hand tool can also be designed for automatically moving the working jaw out of the working position into the released position upon expiration of a prescribed time.

Performing an operation, for example moving, further for example by cutting, the working jaw out of the released position into the working position, requires a radio signal that continues until the working position has been reached during a possible radio remote control process, and is generated by actuating the actuating element. A possible interruption of the radio connection preferably causes the immediate shutdown of the working jaw or an immediate shutdown of the working movement of the hand tool. If this radio connection is not built back up again with a prescribed timespan of a respective 20 to 60) seconds, further for example by 30 seconds, or if no new signal is received by the receiver within this time, the working jaw is automatically moved out of this working position or intermediate position and back into the released position, which preferably corresponds to the base position, or such a movement is triggered.

In the possible embodiment in which the application part is designed to act on the actuation button of the hand tool, a (n initially) continuous line connection is present, which ultimately can lead to an emptying of the accumulator of the hand tool. The line connection is preferably interrupted without a movement of the actuating button (back into a non-actuating position) upon expiration of a prescribed timespan. Any exceeding of the prescribed timespan can be monitored by the control unit provided in the hand tool. If the time is exceeded, an electronic switch can disconnect the electroconductive connection, further for example using an electronic switch (semiconductor switch), for example a thyristor or the like.

BRIEF DESCRIPTION OF THE DRAWINGS

While the invention is explained below based on the attached drawings, they only represent exemplary embodiments. A part that is only described in relation to one of the exemplary embodiments and not replaced by another part in an additional exemplary embodiment due to the feature highlighted therein is thus also described for this additional exemplary embodiment as an at any rate possibly present part. Shown on:

FIG. 1 is a perspective view of a flying device with an application part attached to the flying device, as well as a remote control device for the flying device, in a first embodiment;

FIG. 2 is the front view against the flying device;

FIG. 3 is a side view against the flying device;

FIG. 4 is a perspective, bottom view against the flying device with the application part moved into an open position;

FIG. 5 is a perspective view of the flying device essentially corresponding to FIG. 1, after arranging a hand tool in the application part of the flying device;

FIG. 15 is another side view corresponding to FIG. 7 with the pedestal omitted, relating to a third embodiment.

DESCRIPTION OF THE EMBODIMENTS

Figure 6:
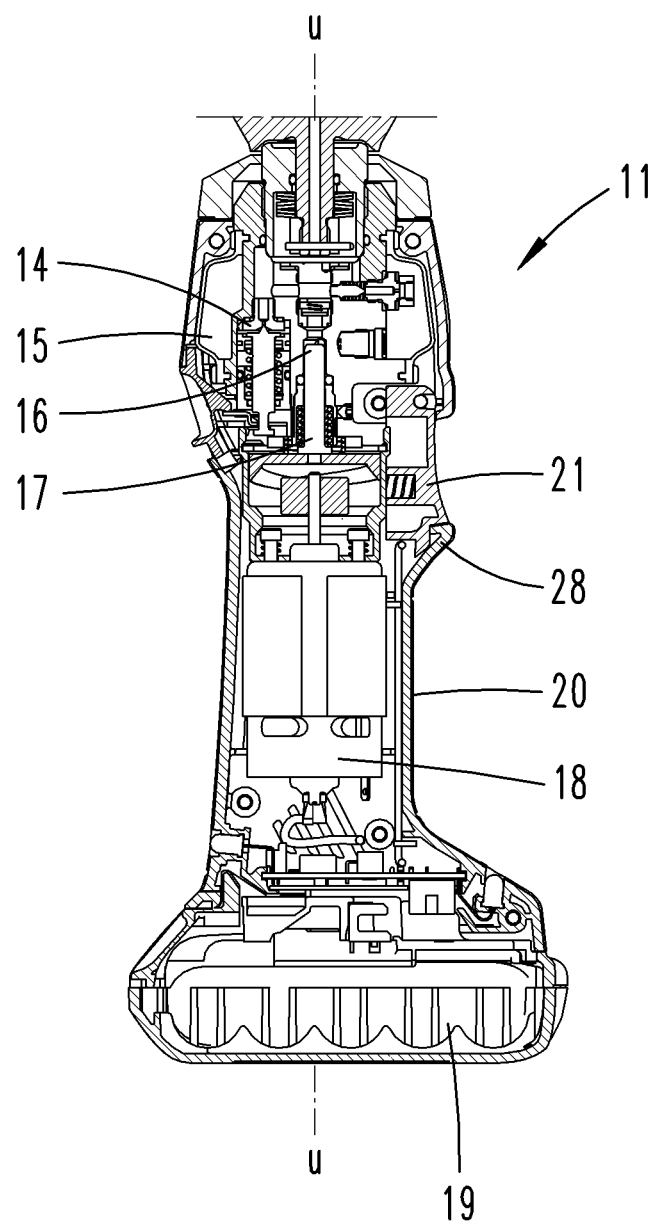
FIG. 6 is a longitudinal section through the hand tool.

An automatically movable flying device 1 for remote control via a remote control device is illustrated and described, initially with reference to FIG. 1.

The flying device 1 is designed for vertical takeoff and landing, and for this purpose has four propellers in the depicted exemplary embodiment, each having rotational axis x that runs essentially perpendicular to the subsurface 4 with respect to a state of the flying device 1 standing upright on a subsurface 4.

In the exemplary embodiment shown, the propellers 3 are mounted at the end on support arms 6 attached to a flying device base body 5.

In the exemplary embodiment shown, two spaced apart pedestals 7 are provided underneath the flying device/base body 5 to support the flying device 1 as a whole on the subsurface 4 relative to the standing position.

As preferred, a radio receiver unit 37 and a signal controller 38 can be provided in the flying device 1, in particular in the base body 5, for receiving the control signals transmitted via the remote control device 2.

The remote control device 2 has one or more control elements 8 for flight control of the flying device 1.

As also shown as well, the flying device 1 can further have an electronic camera 9, preferably in the area of the base body 5. The latter is preferably arranged on the front side of the base body 5 so as to optically acquire the area located in front of the flying device 1.

A longitudinal central axis y of the flying device y results with reference to a top view of the flying device 1, wherein this top view represents the rotational axes x as points. The propellers 3 or the support arms 6 carrying them are provided on either side of this longitudinal central axis y, as is a respective pedestal 7.

As further also preferred, the images acquired with the camera 9 can be transmitted to the remote control device 2 via a radio interface, and here possibly be shown on a display 10 designed as part of the remote control device 2. This allows user-friendly operation of the flying device 1 even given indirect visual contact with the flying device 1.

The flying device 1 is suitable for receiving and carrying a hand tool 11 or a tool. As also preferred, such a hand tool 11 can be present in the form of an electric motor-driven hand tool. In this regard, the illustration shows an electrohydraulic device, which essentially has an elongated rod-shaped design, which supports one-handed operation during a per-hand use of the device. For example, such a rod-shaped device is known from the EP 1519813 B1 cited at the outset.

A working head 12 is arranged on the hand tool 11, which in the exemplary embodiments shown has two working jaws 13. The latter are designed as cutting blades, and can be swiveled around a rotational axis z out of a released position into a working position. With respect to the depicted working head 12, reference is made to the WO 2017/125272 A2 mentioned at the outset.

The depicted working head 12 is only exemplary. The latter is preferably replaceable. In this way, the hand tool 11 can further also be used as a pressing device or the like, and further also as a punch-cutter, etc., for example.

With respect to the illustration on FIG. 6, the correlation with the subject matter described in the mentioned EP 1519813 B1 can be discerned in the upper area of the hand tool 11 designed as a hull device in terms of a return valve 14, a tank 15 and a pump tappet 16. As can also be discerned in this conjunction in particular, a hydraulic fluid pump 17 and an electric motor 18 for the hydraulic fluid 17 are provided, arranged one after the other. The arrangement of an accumulator 19 provides for the electrical supply in particular to the electric motor 18, but beyond that also to a control unit 39 and additional electrical components in the hand tool 11.

In addition, the hand tool 11 has a grip region 20 that offers a holding region 35 for conventionally enclosing the hand tool housing by means of one hand. A triggering means 36 in the form of an actuating button 21 is ergonomically favorably allocated to the grip region 20.

The hand tool 11 can be applied to the flying device 1 in particular in the area of the grip region 20 by way of an application part 22. The application part 22 can be designed as a cuff with two half-shell shaped cuff parts 23 and 24.

The cuff parts 23 and 24 are movably hinged with each other by way of a geometric hinge axis w that extends in the direction of extension of a longitudinal axis v of the application part 22.

With respect to the inner cross section, the closed application part 22 is adjusted to the housing shape of the hand tool 11 in the grip region 20.

Flap-like cantilevers 25 are formed on the cuff parts 23 and 24 diametrically opposite to the hinged region of the latter.

The closed position or enclosing position of the application part 22 can be mechanically locked. In the exemplary embodiments shown, this is achieved using a screw connection 26 that acts in the area of the cantilevers 25.

The application part 22 serves to allow a remote controllability of the hand tool 11 using the flying device 1.

To this end, the application part 22 is first upwardly swiveled around the hinge axis w and guided over the grip region 20 while releasing the lock established by the screw connection. Closing the cuff parts 23 and 24 and establishing a final lock with the screw connection 26 fastens the hand tool 11 in the application part 20 in this grip region 20, hereby fixing it in place both relative to a longitudinal axis u of the grip region 20 and in the circumferential direction.

The longitudinal axis u of the grip region 20 and the longitudinal axis v of the application part 22 are preferably aligned in this allocated position.

In the enclosing position, a housing mandrel 28 bordering the actuating button 21 toward the grip region 20 can pass through a windowlike opening 27 provided in the folding hinge region of the application part 22.

A housing section of the application part 22 displaces the actuating button 21 into the actuating position for the duration that the hand tool 11 is arranged in the application part 22.

Accordingly, the triggering that takes place via the actuating button 21 with the insertion of the hand tool 11 in the application part 22 makes it possible to initially perform an which operation, is preferably ended automatically by a valve-controlled piston return accompanied by a pivoting back of the working jaws 13.

With respect to the return valve exemplarily used for this purpose, reference is made to WO 2016/134951 A1 by way of example. The content of this patent application is also included in its entirety in the disclosure of the present invention, also for the purpose of including features of this patent application in claims of the present invention.

Also known from the aforementioned WO application is to trigger such a return valve electronically, for example electromagnetically, via a corresponding control signal.

As an alternative, however, the hand tool 11 can be electronically or also mechanically switched over to remote control operation before the hand tool 11 is applied in the application part 22, so that the actuation of the actuating button 21 via the application part 22 does not result in a triggering for displacing the working jaws 13. In this regard, an automatic detection of the application part 22 can also be provided, preferably already during preparation.

After insertion in the application part 22, the hand tool 11 is preferably operated solely by remote control, for example through the use of a radio remote control, preferably the remote control device 2, which is also used to control the flying device 1. To this end, the hand tool 11 has a radio receiver 40, and further at least one control unit 39, which converts the received radio signals into a triggering of a working movement.

The hand tool 11 held in the application part 22 can in this way be remotely transported by means of the flying device 1 to a job location, for example to a job location situated high up by comparison to the subsurface 4, which is difficult or impossible for the user to reach so as to manually operate the hand tool 11.

At the prescribed job location, the hand tool 11 can be used to cut through a cable harness or a rod (object O), for example by configuring the working jaws 13 as cutting edges, to which end the remote control device 2 is provided with at least one separate actuating element 29 that triggers the working process of the hand tool 11. This actuating element 29 can be a conventional button or the like.

The radio transmitter 41 provided in the remote control device 2 is here operatively connected with the radio receiver 40 of the hand tool 11.

With the hand tool 11 arranged on the flying device 1, the longitudinal axis u of the hand tool 11 is essentially aligned to the longitudinal central axis y of the flying device 1, wherein the working head 12 can be arranged in the acquisition area of the camera 9 in a possible embodiment.

Figure 7:
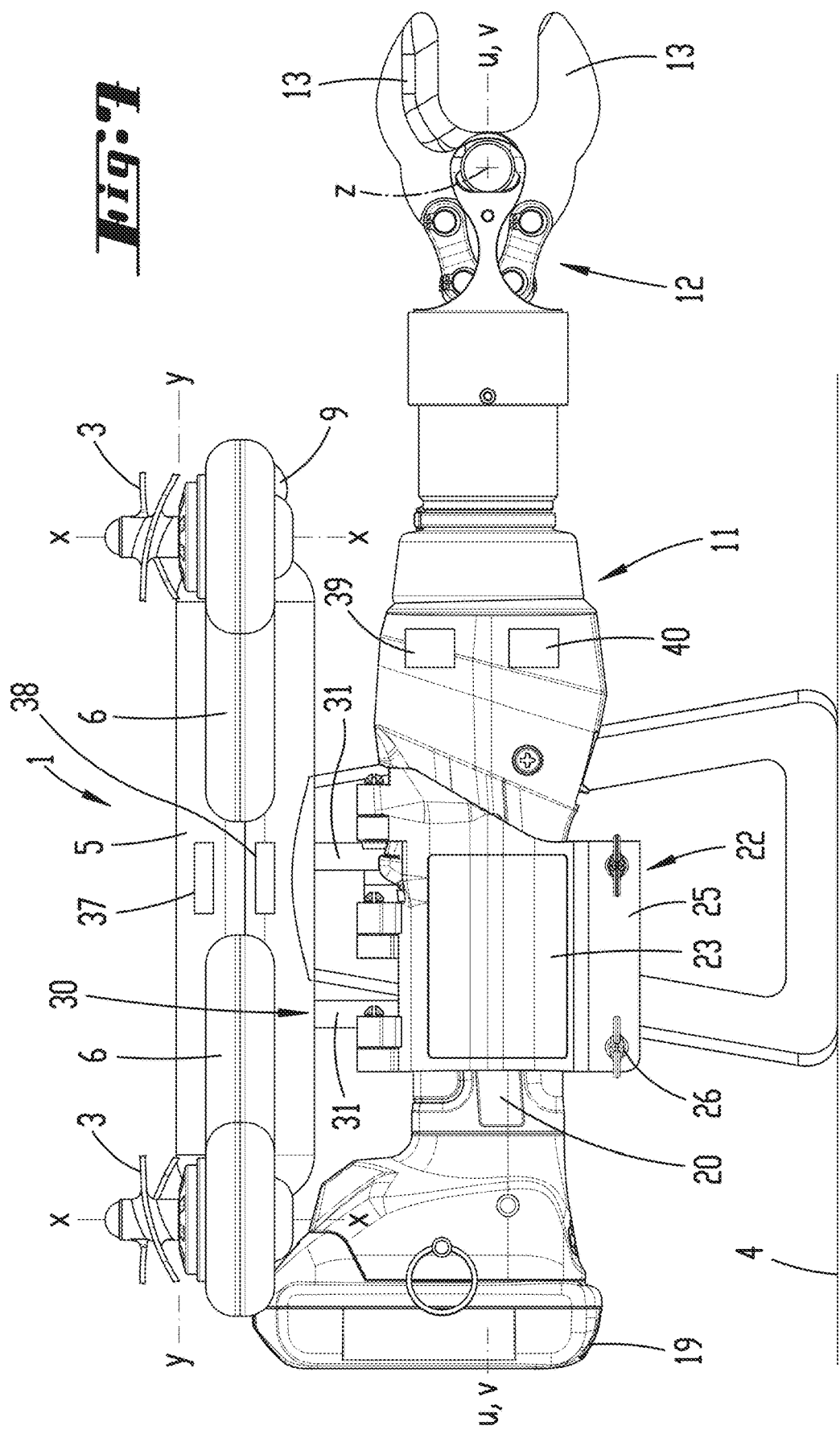
FIG. 7 is the side view against the flying device with received hand tool, with a pedestal omitted.
Figure 8:
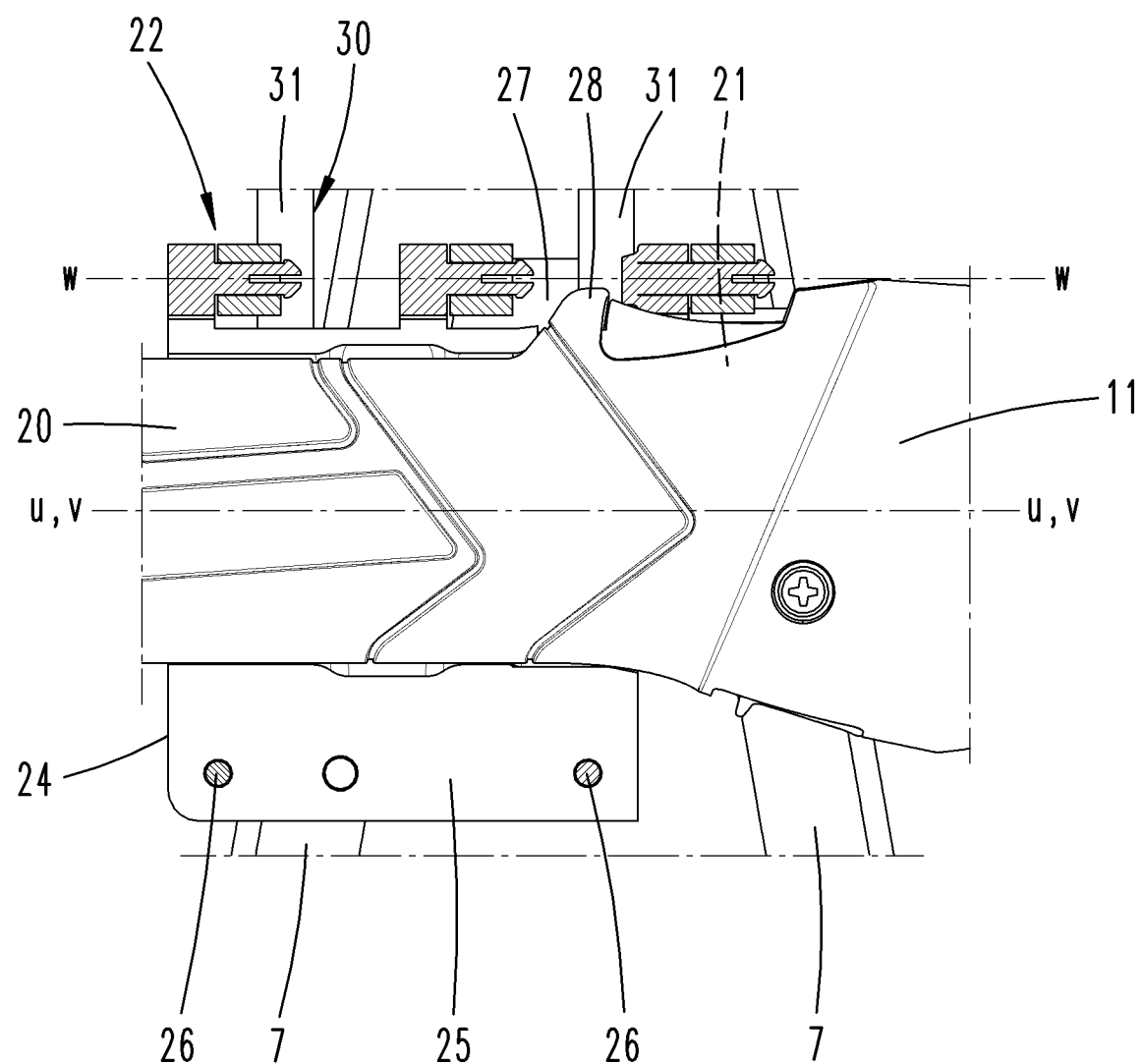
FIG. 8 is a longitudinal sectional view through the application part with the hand tool received.
Figure 9:
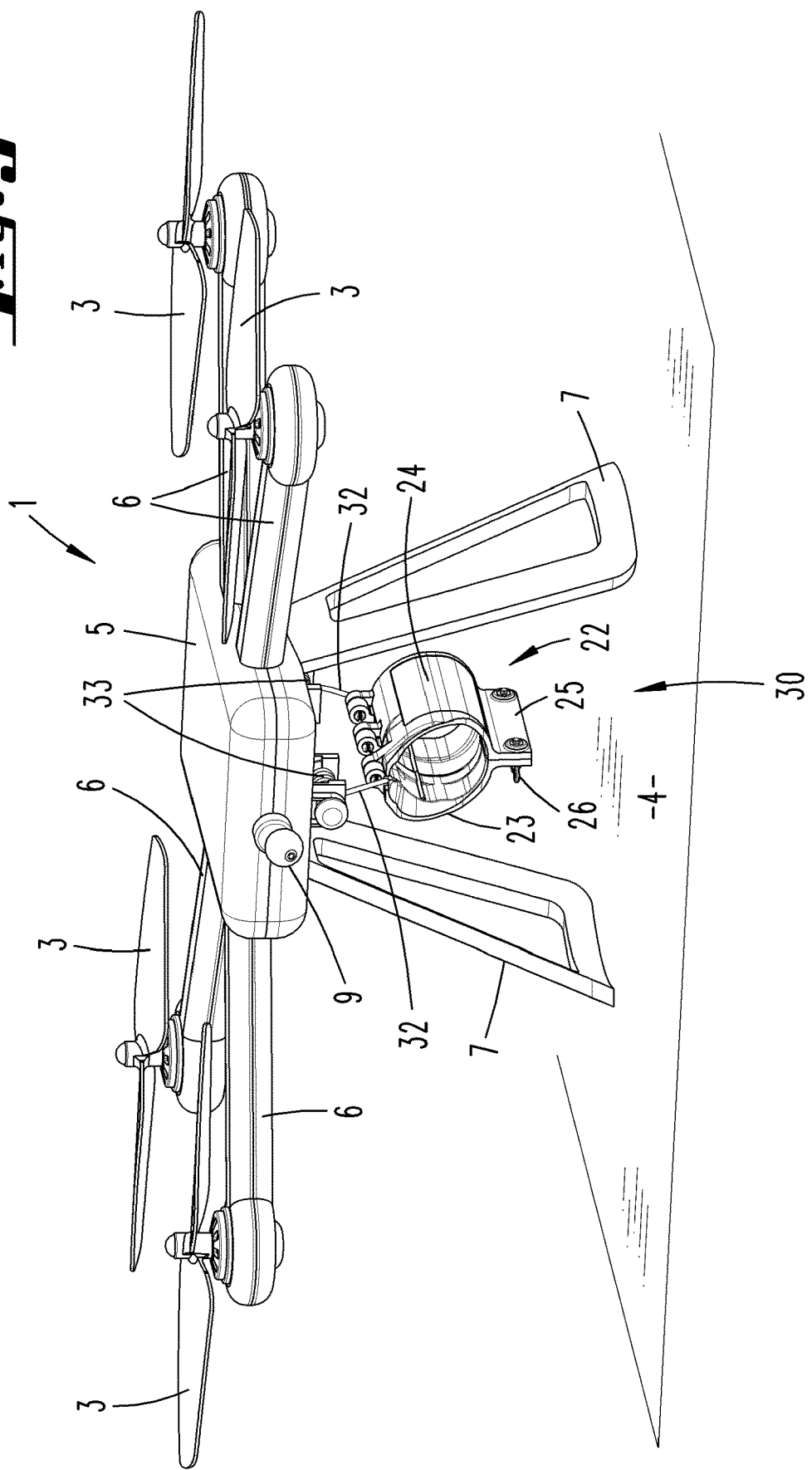
FIG. 9 is a perspective view of the flying device essentially corresponding to FIG. 1, but relating to a second embodiment with application part arranged over extendible holding means.
Figure 10:
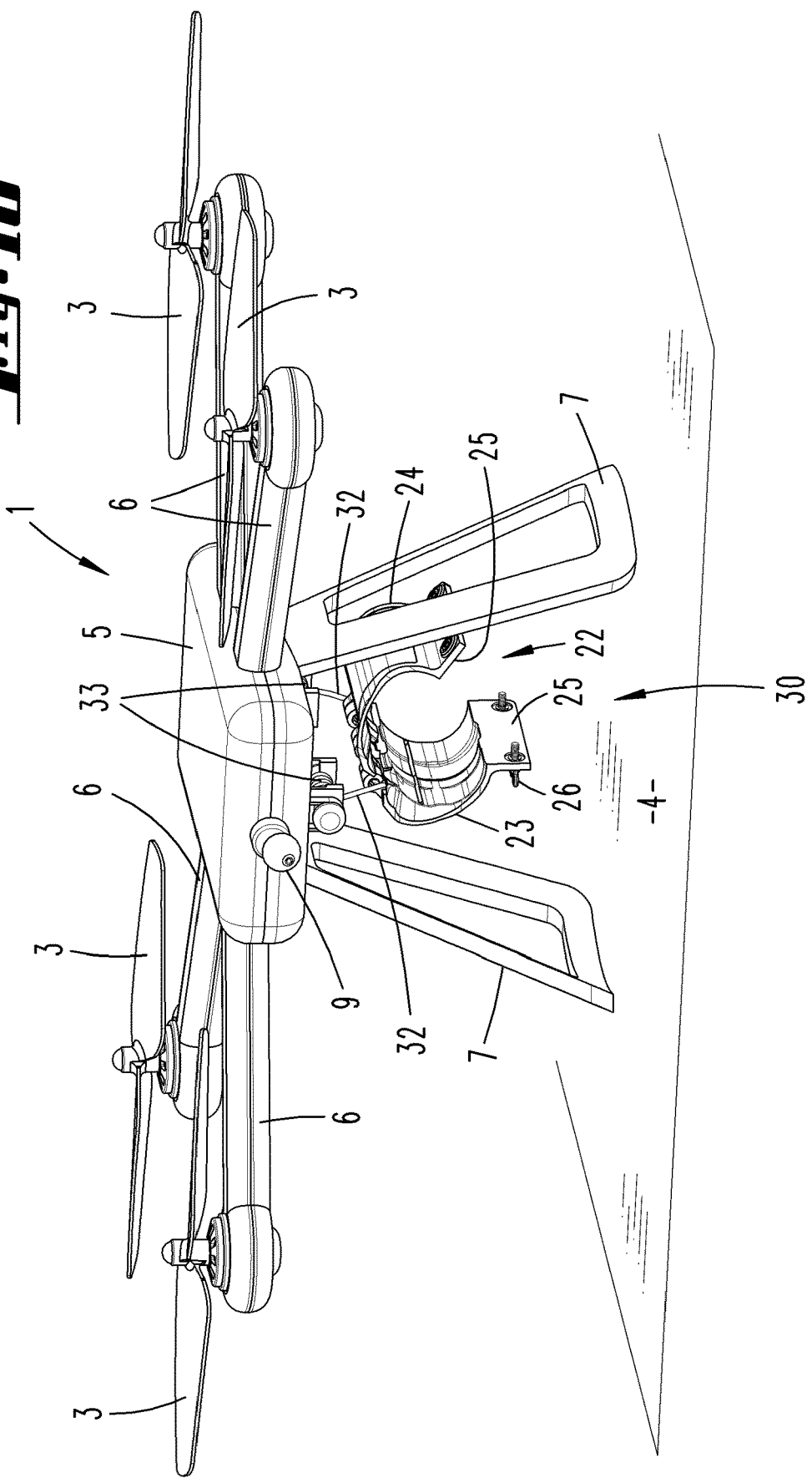
FIG. 10 is a view essentially corresponding to FIG. 4, but relating to the second embodiment.
Figure 11:
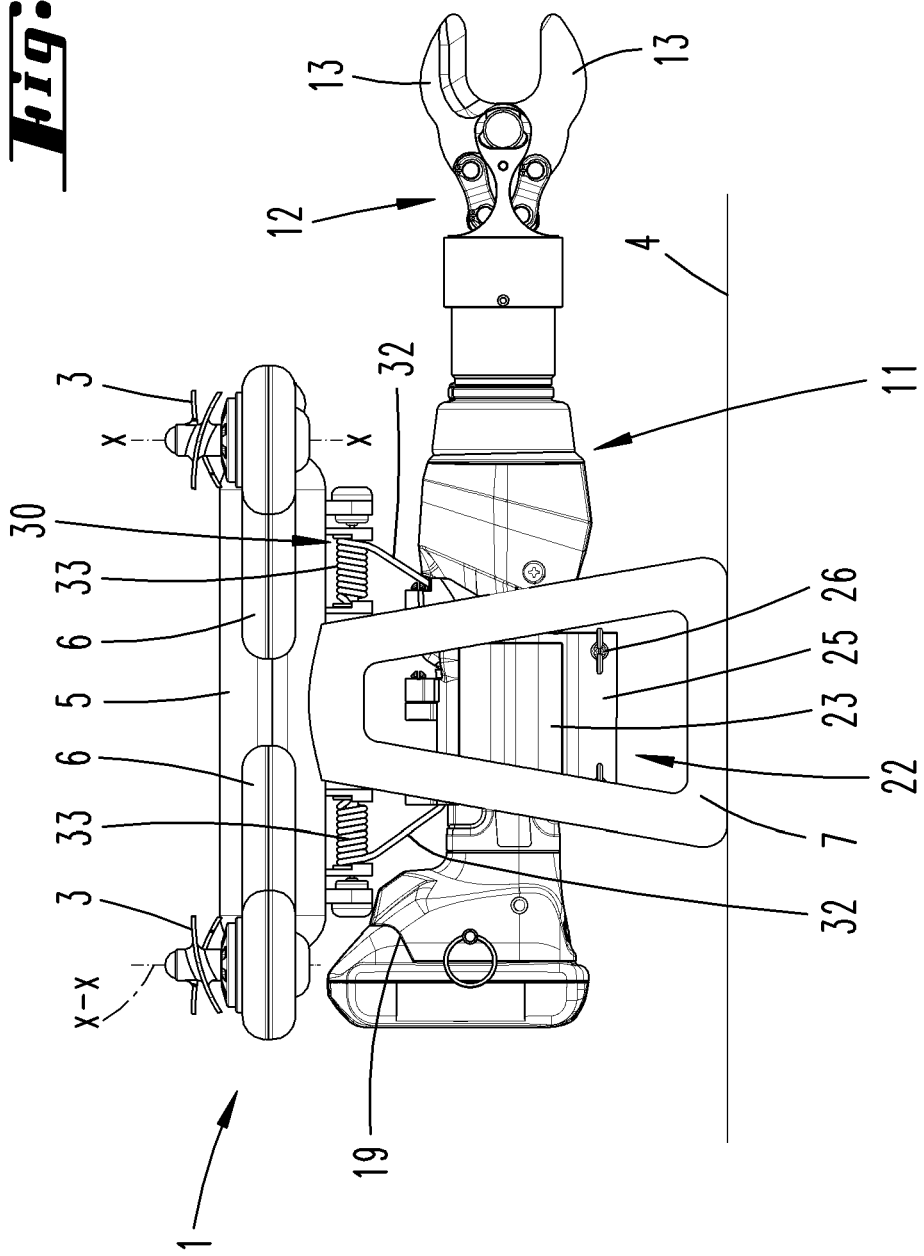
FIG. 11 is a side view of the flying device of the second embodiment with hand tool arranged, relating to a position in which the hand tool is drawn toward the flying device.
Figure 12:
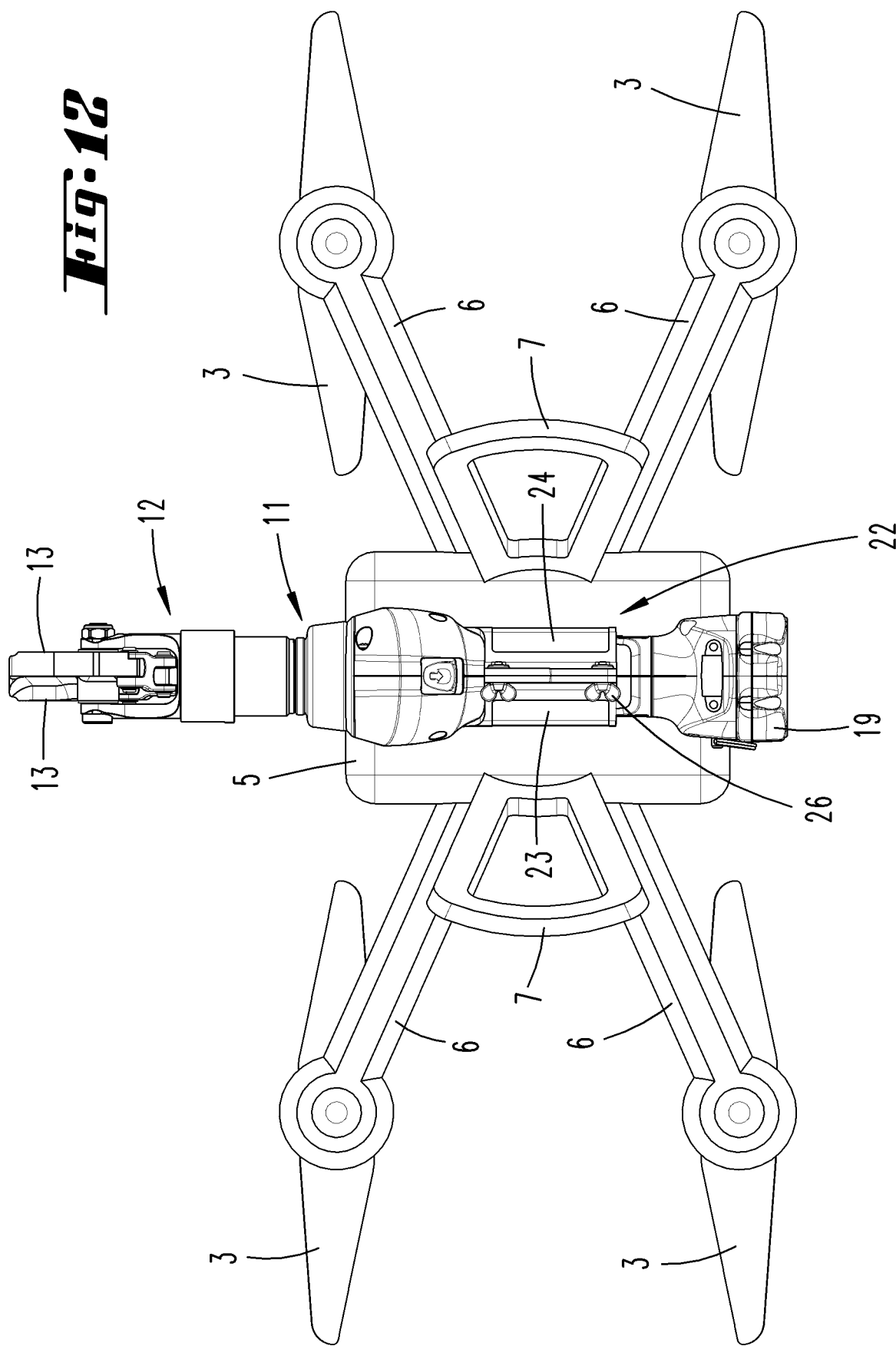
FIG. 12 is the bottom view of FIG. 11.
Figure 13:
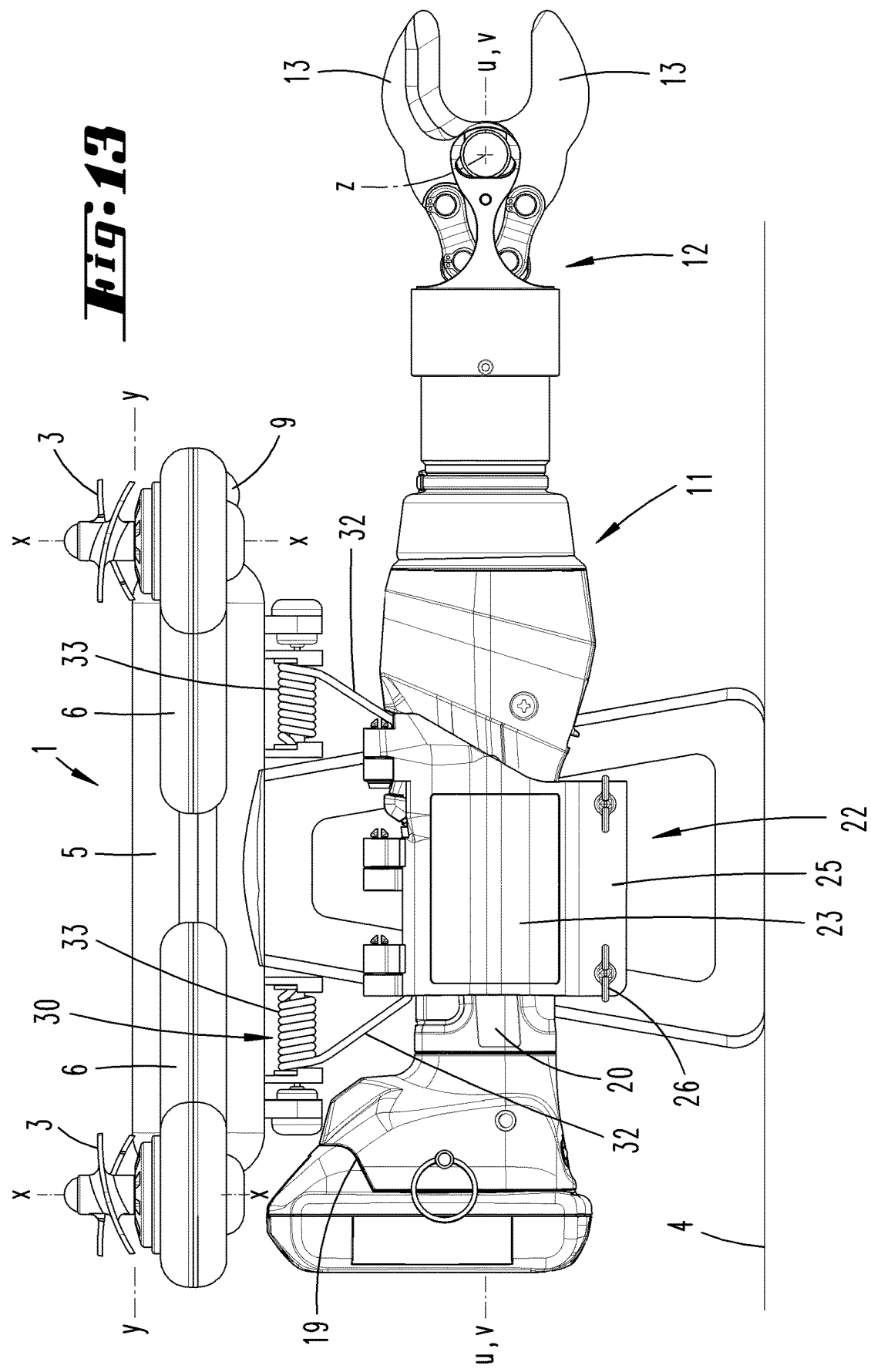
FIG. 13 is a side view according to FIG. 7 with a pedestal omitted, but relating to the second embodiment.
Figure 14:
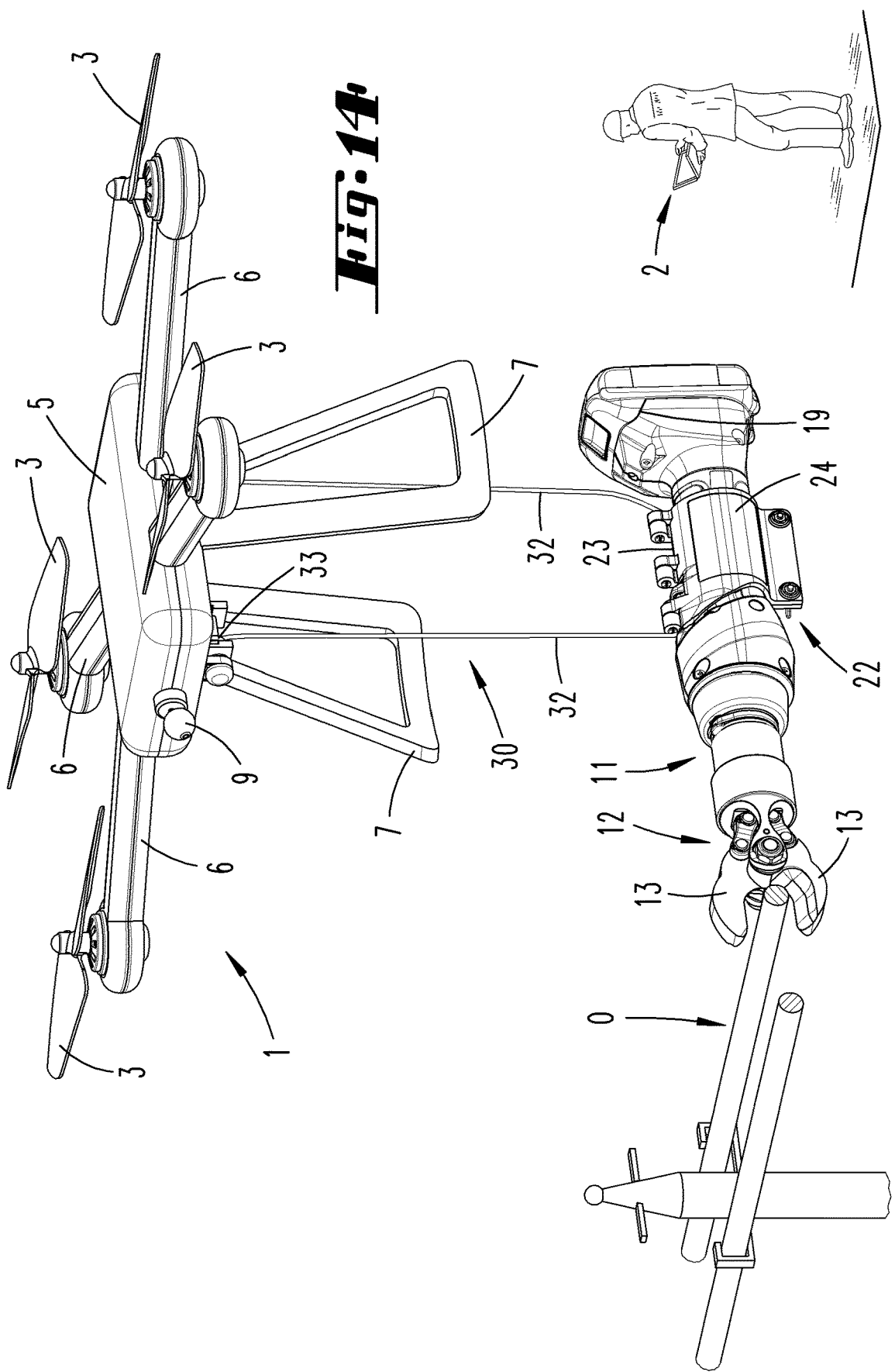
FIG. 14 is the flying device in a flight situation with hand tool lowered relative to the flying device for performing an operation.

At least with respect to a base position, for example which is assumed in the standing position on the subsurface 4, the hand tool 11 further extends between the pedestals 7, wherein the latter protrude downwardly over the hand tool 11 in relation to a state in which the flying device 1 is parked on the subsurface 4 (see FIG. 7).

In the standing position, the working head 12 also protrudes laterally, preferably frontally, over the flying device 1 as such. Accordingly, the hand tool 11 extends over an outline of the flying device 1, in particular of the flying device base body 5, in the area of the working head 12.

The hand tool 11 or the application part 22 that receives the hand tool 11 is indirectly or directly attached underneath the flying device 1 to its base body 5 via attachment means 30.

In the first exemplary embodiments depicted on FIGS. 1 to 8, a rigid connection forms the attachment means 30. The latter are correspondingly provided by rigid attachment arms 31 that are operationally nondetachable both with the flying device 1 and the application part 22.

The embodiments on FIGS. 9 to 15 show two solutions, in which the attachment means 30 are flexible in design. The attachment means 30 of the second embodiment depicted on FIGS. 9 to 14 comprise flexible, extendible holding means 32 in the form of ropes. The one ends of these ropes (two ropes in the exemplary embodiment) are secured to the application part 20. The ends of the ropelike holding means 32 facing away from the application part 22 are each held in a preferably electric motor-drivable winch 33. A separate actuating element can be provided on the remote control device 2 for actuating the winch 33. However, the holding means 32 can also be wound or unwound as a function of additional radio signals.

The hand tool 11 held in the application part 22 can be lowered relative to the flying device or lifted toward the flying device 1 via the holding means 32 and the winch 33.

In any event, this enables a relative movability of the hand tool 11 relative to the flying device 1.

The embodiment on FIG. 15 shows an alternative, flexible attachment means 30. Provided here is a flexible attachment arm 34, for example made out of a flexible plastic material, which enables a movability of the hand tool 11 relative to the flying device 1. As a result, impacts, for example which act on the hand tool 11 during the working process, are not conveyed to the flying device 1, or at least not to an extent that would damage it.

Making the connection with the flying device 1 with ropelike holding means 32 provides the option of keeping the flying device 1 at a distance while executing the working process. To this end, the flying device 1 can in one possible embodiment assume a working position, and from there lower the hand tool by actuating the winch 33, until it has reached the work area. For example, if the working head 12 is designed as a cutting tool, it is positioned via a controlled flight maneuver in precisely such a way that the cable to be severed (object O) or the rod to be severed rests in the open tool jaw. After this, the user executes the working process via the actuating element 29. Here as well, any forces acting on the hand tool 11 are essentially not conveyed to the flying device 1.

A whiplash effect that might arise while severing cables, for example, proves harmless to the flying device 1 owing to the distance from the hand tool 11.

Another possible method provides that the flying device 1 fly toward the work area with the hand tool 11 lifted between its pedestals 7, in doing so place the working head 12 of the hand tool against the cable or rod to be severed, and thereafter climb vertically upward while releasing a length of holding means via the winch 33 to a distanced position relative to the hand tool 11. In addition, the holding means can here also be released, such that it can extend quasi tension-free between the hand tool 11 and the flying device 1. For example, after executing a cutting process, the hand tool 11 that initially acted on the material to be cut drops off, and is caught by the holding means 32. At the same time, the winch 33 blocks the holding means 32 as the hand tool 11 drops with a backward impingement, similarly to the system known from motor vehicle safety belts. The forces previously acting on the flying device 1 can thereby be better offset by the latter in comparison to a rigid connection, since these forces do not arise suddenly, and since the flying device 1 can estimate its position through free flight before performing the operation, here the cutting process. The hand tool 11 is thereafter pulled back toward the flying device 1 by the winch 33.

The function of the actuating element 29 in the remote control device 1 is equivalent to the function of the actuating button 21 in the hand tool 11. Accordingly, a preferred design requires that the actuating element 29 preferably be actuated until the end of the operation for an a operation to be complete. In one possible embodiment, continuous signal is absolutely necessary up until the operation has concluded, for example a process of closing the working jaws. In a preferred embodiment, interrupting the radio signal immediately stops the working movement, here in particular immediately stops the advancing piston. This can be done intentionally, but also as the result of an unintended cutoff of the radio connection. Notwithstanding the above, after a prescribed timespan has elapsed, the hand tool 11, in particular its piston and the working jaws 13 connected therewith, run back into a released position.

The above serve statements to explain the inventions encompassed by the application as a whole, which further develop the prior art at least by the following feature combinations, and even each independently, wherein two, several or all of these feature combinations can also be combined, specifically:

A hand tool 11 designed to be remotely controlled, characterized [in that] by a removable application part 22 held in the grip region 20, wherein the hand tool 11 is attached to an automatically movable flying device 1 by attachment means 30.

A tool designed to be remotely controlled, characterized [in that] by a removable application part 22 held in the holding region 35, wherein the tool is attached to an automatically movable flying device 1 by attachment means 30.

A hand tool 11 or tool, characterized in that the attachment means 30 enables a movability of the hand tool 11 or tool relative to the flying device 1.

A hand tool 11 or tool, characterized in that the flying device 1 is designed for vertical takeoff and landing, and/or preferably that the flying device 1 has one or several propellers 3, and/or preferably that the one or several propellers 3 have a rotational axis z that runs essentially perpendicular to the subsurface 4 with the flying device 1 in a state standing upright on a subsurface 4, and/or preferably that the flying device 1 has one or several pedestals 7, and/or preferably that a remote control device 2 is provided for the flying device 1.

A hand tool 11 or tool, characterized in that, in a state attached to the flying device 1, the hand tool 11 or tool has a working head, which protrudes laterally over the flying device 1 as such in relation to a standing position of the flying device 1, and/or preferably that the pedestal 7 protrudes downwardly over the hand tool 11 or tool in relation to a state of the flying device 1 parked on the subsurface 4, and/or preferably that two pedestals 7 are provided, and that the hand tool 11 or tool is attached between the pedestals 7.

A hand tool 11 or tool, characterized in that the attachment means 30 comprise flexible, extendible holding means 32, with which the hand tool 11 or tool can be released or tightened, following the force of gravity, and/or preferably that the flexible, extendible holding means 32 comprise a rope, with which the hand tool 11 or tool can be lowered from the flying device 1 or pulled toward the flying device 1.

A hand tool 11 or tool, characterized in that the attachment means 30 comprises a flexible attachment arm 34, which allows the hand tool 11 or tool to move relative to the flying device 1 without otherwise loosening the attachment.

A hand tool 11 or tool, characterized in that the hand tool 11 or tool is designed for radio remote control, and to this end has a radio receiver 40 and a control unit 39, which is designed to convert received radio signals so as to trigger a working movement of the hand tool 11 or tool.

A hand tool 11 or tool, characterized in that the remote control device 2 has an actuating element 29 for remotely triggering a working movement of the hand tool 11 or tool.

A hand tool 11 or tool, characterized in that the remote control device 2 has a radio transmitter 41 operatively connected via the actuating element 29 for operative connection with the radio receiver 40 of the hand tool 11.

All disclosed features (taken separately or in combination with each other) are essential to the invention. The disclosure of the application hereby also incorporates the disclosure content of the accompanying/attached priority documents (copy of preliminary application) in its entirety, further for the purpose of also including features in these documents in claims of the present application. Even without the features of a referenced claim, the subclaims characterize independent inventive further developments of prior art with their features, in particular so as to initiate partial applications based on these claims. The invention indicated in each claim can additionally have one or several of the features indicated in the above specification, in particular those provided with reference numbers and/or included on the reference list. The invention also refers to embodiments in which individual features mentioned in the above specification are not realized, in particular to the extent they are obviously unnecessary for the respective intended application, or can be replaced by other technically equivalent means.

| REFERENCE LIST | |
| --- | --- |
| 1 | Flying device |
| 2 | Remote control device |
| 3 | Propeller |
| 4 | Subsurface |
| 5 | Flying device base body |
| 6 | Support arm |
| 7 | Pedestal |
| 8 | Control element |
| 9 | Camera |
| 10 | Display |
| 11 | Hand tool |
| 12 | Working head |
| 13 | Working jaw |
| 14 | Return valve |
| 15 | Tank |
| 16 | Pump tappet |
| 17 | Hydraulic pump |
| 18 | Electric motor |
| 19 | Accumulator |
| 20 | Grip region |
| 21 | Actuating button |
| 22 | Application part |
| 23 | Cuff part |
| 24 | Cuff part |
| 25 | Cantilever |
| 26 | Screw connection |
| 27 | Opening |
| 28 | Housing mandrel |
| 29 | Actuating element |
| 30 | Attachment means |
| 31 | Attachment arm |
| 32 | Holding means |
| 33 | Winch |
| 34 | Attachment arm |
| 35 | Holding region |
| 36 | Triggering means |
| 37 | Radio receiver unit |
| 38 | Signal controller |
| 39 | Control unit |
| 40 | Radio receiver |
| 41 | Radio transmitter |
| u | Longitudinal axis |
| v | Longitudinal axis |
| w | Hinge axis |
| x | Rotational axis |
| y | Longitudinal central axis |
| z | Rotational axis |
| o | Object |

The invention claimed is:

1. An assembly comprising:
an automatically movable flying device;
a hand tool including a housing defining a grip region around which a hand of a user can be wrapped for operation of the hand tool, a working head at an end of the housing for performing a working operation, and a displaceable actuating button in the grip region, wherein the working head is configured to be activated to perform the working operation by a user displacing the actuating button into an actuating position, the hand tool is further configured to be electronically or mechanically switched over to a remote control operation to perform the working operation and includes a radio receiver and a control unit which are operatively coupled together and which allow for the hand tool to be operated under remote control;
an application part coupled to the flying device and couplable to the hand tool to arrange the hand tool in the application part, the application part surrounds the grip region when coupled to the hand tool, the application part engages and displaces the actuating button into an actuating position for the duration that the hand tool is arranged in the application part, wherein the hand tool operates under remote control when the application part is coupled to the hand tool, and wherein the application part is removable from the grip region; and a remote control device configured to provide radio signals to the radio receiver of the hand tool, wherein the control unit of the hand tool converts the radio signals into a triggering of a working movement to perform the working operation with the actuating button in the actuating position as a result of being displaced into the actuating position by the application part when the application part is coupled to the hand tool.

2. The assembly according to claim 1, wherein the flying device is designed for vertical takeoff and landing.

3. The assembly according to claim 1, wherein the flying device has at least one propeller having a rotational axis that runs substantially perpendicular to a subsurface with the flying device in a state standing upright on the subsurface.

4. The assembly according to claim 3, wherein the flying device has at least one pedestal which rests the flying device on the subsurface.

5. The assembly according to claim 4, wherein the at least one pedestal protrudes downwardly over the hand tool in relation to a state of the flying device parked on the subsurface.

6. The assembly according to claim 4, wherein two pedestals are provided, and the hand tool is attached between the pedestals.

7. The assembly according to claim 1, wherein the remote control device is further configured to control movement of the flying device.

8. The assembly according to one claim 1, wherein the working head protrudes laterally over the flying device in relation to a standing position of the flying device.

9. The assembly according to claim 1, wherein the remote control device comprises an actuating element configured to remotely trigger the working operation of the working head.

10. The assembly according to claim 9, wherein the remote control device further comprises a radio transmitter operatively connected via the actuating element for operative connection with the radio receiver of the hand tool.

11. The assembly according to claim 1, wherein the actuating button is within the grip region and is configured to be depressed.

12. The assembly according to claim 1, wherein the application part comprises a pair of cuffs which are hingedly coupled together.

13. The assembly according to claim 12, wherein the actuating button is within the grip region and is configured to be depressed, the actuating button extending through an opening in the cuffs.

14. The assembly according to claim 1, further comprising attachment means for coupling the application part to the flying device.

15. The assembly according to claim 14, wherein the attachment means enables a movability of the hand tool relative to the flying device.

16. The assembly according to claim 14, wherein the attachment means comprise flexible, extendible holding means, with which the hand tool can be released or tightened.

17. The assembly according to claim 16, wherein the flexible, extendible holding means comprise a rope, wherein the hand tool is lowered from the flying device by extension of the rope or pulled toward the flying device by retraction of the rope.

18. The assembly according to claim 17, further comprising a winch which can be activated to extend or retract the rope.

19. The assembly according to claim 14, wherein the attachment means comprise a flexible attachment arm which allows the hand tool to move relative to the flying device without otherwise loosening the attachment means.

* * * * *